United States Patent [19]
Brazzola

[11] 4,364,374
[45] Dec. 21, 1982

[54] HEAT-ABSORBENT PANEL FOR SOLAR ENERGY AND SLOPING ROOF COMPOSED OF SUCH PANELS

[75] Inventor: Luigi Brazzola, Castel San Pietro, Switzerland

[73] Assignee: Elioform AG, Triesen, Liechtenstein

[21] Appl. No.: 116,811

[22] Filed: Jan. 30, 1980

[30] Foreign Application Priority Data

Jan. 31, 1979 [CH] Switzerland .......................... 911/79
Jan. 4, 1980 [CH] Switzerland .......................... 22/80

[51] Int. Cl.³ ................................................ F24J 3/02
[52] U.S. Cl. ........................... 126/442; 126/DIG. 2; 126/432; 126/450
[58] Field of Search ................. 126/DIG. 2, 432, 450, 126/446, 448, 442, 441

[56] References Cited

U.S. PATENT DOCUMENTS

4,136,670  1/1979  Davis .................................. 126/450
4,138,991  2/1979  Lorenz ................................ 126/450

FOREIGN PATENT DOCUMENTS

1804776  5/1970  Fed. Rep. of Germany .
2309307  8/1974  Fed. Rep. of Germany .
2558612  7/1977  Fed. Rep. of Germany .
2640333  3/1978  Fed. Rep. of Germany .
2702939  7/1978  Fed. Rep. of Germany .
2729313  1/1979  Fed. Rep. of Germany .
2807487  8/1979  Fed. Rep. of Germany ... 126/DIG. 2
2302489  2/1976  France .
2330974  6/1977  France .
7634152  6/1977  France .
7707253  3/1977  France .
2386786  11/1978  France .
1521637  8/1978  United Kingdom .

*Primary Examiner*—Carroll B. Dority, Jr.
*Attorney, Agent, or Firm*—Young & Thompson

[57] ABSTRACT

A panel that absorbs solar energy is emplaced as a conventional inclined roof tile with an appearance comparable to that of a tile roof, and comprises a metallic or non-metallic tile which has at least one raised portion (4) that collects heat. A seat is provided for a metallic tube (5) through which flows the fluid to be heated. A transparent cap (7) covers, insulates and protects the raised portion (4) of the tile and the tube. The tile has on its upper surface protuberances (9) connected by conduits (10) permitting circulation of the air contained therein toward the raised collector portion (4) which directly absorbs the solar heat.

4 Claims, 6 Drawing Figures

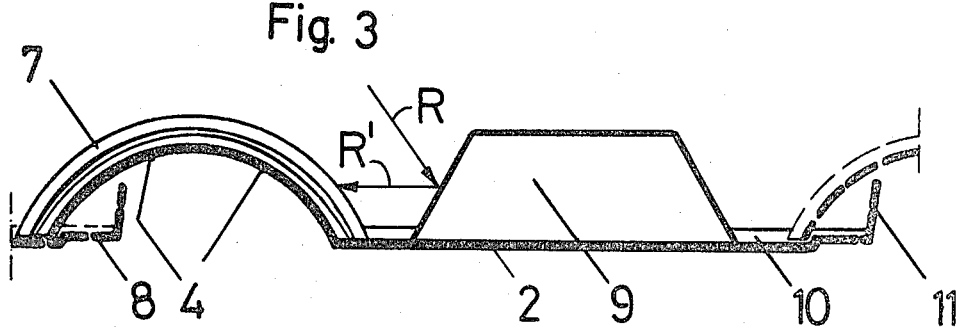
Fig. 3
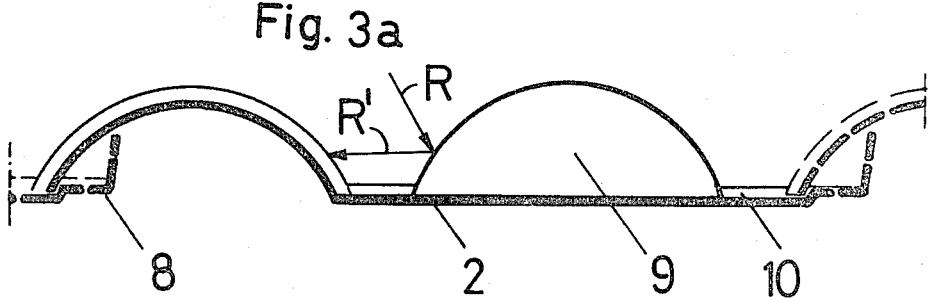
Fig. 3a
Fig. 3b
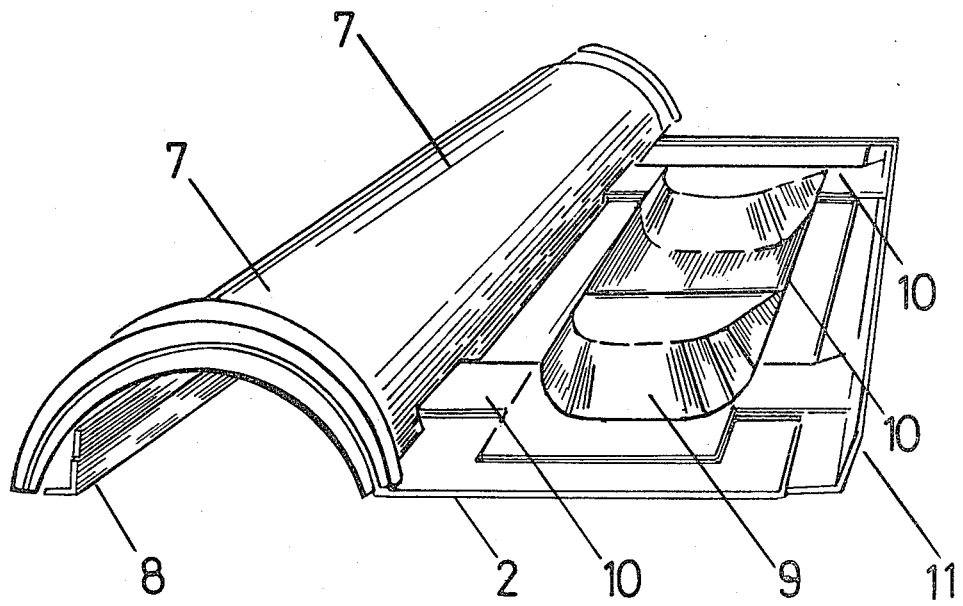

HEAT-ABSORBENT PANEL FOR SOLAR ENERGY AND SLOPING ROOF COMPOSED OF SUCH PANELS

The present invention relates to heat absorbent panels for solar energy and a sloping roof composed of such panels.

At present, the panels used on roofs to collect solar energy for heating are generally comprised of a background that is black and absorbs heat, an intermediate compartment and an insulating and protective window or glass fixed to the edges and projecting from the background. The tubes in which the liquid to be heated circulates are disposed in the intermediate compartment.

Such panels are subjected to severe thermal stresses and require considerable maintenance. Moreover, over a long period of time, they do not ensure complete watertightness of the roof and, from an aesthetic standpoint, they are noticeably different from a roof of conventional tiles, creating reflections and undesirable vibrations, and are difficult to emplace and replace. Moreover, for large surfaces, the cost of known panels is high.

The panel according to the invention is characterized in that it comprises a metallic or non-metallic tile, preferably blackened, having preferably at least one raised heat-collecting portion, in which may be provided the seat for a metallic tube traversed by the liquid to be heated. A transparent cap is provided as a cover, to insulate and protect the raised portion of the tile and the tube, the tile presenting on its exposed face one or more protuberances each forming an inwardly-opening cavity interconnected by conduits permitting the circulation of air contained therein so as to transport the heat toward the raised portions of the collector.

These and other features of the invention will become apparent from a consideration of the accompanying drawings, in which:

FIGS. 3, 3a and 3b show three slightly differing variations of a second embodiment.

FIG. 1 shows a transverse section of the panel: the tile 2 provides raised heat-collecting portion 4.

Figure 1:
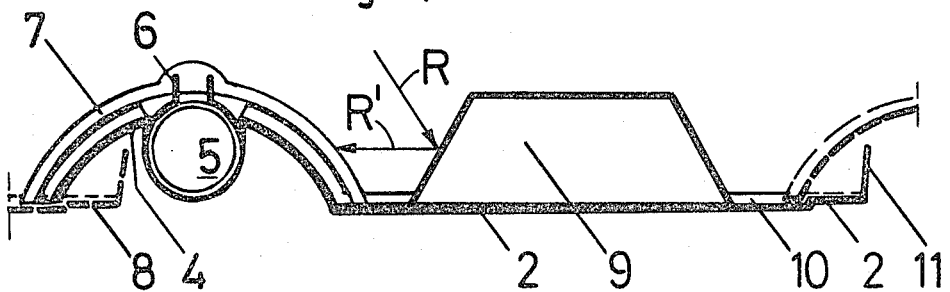
FIGS. 1, 1a and 2 show by way of example three slightly differing variants of a first embodiment in metal of a panel according to the invention.
Figure 1A:
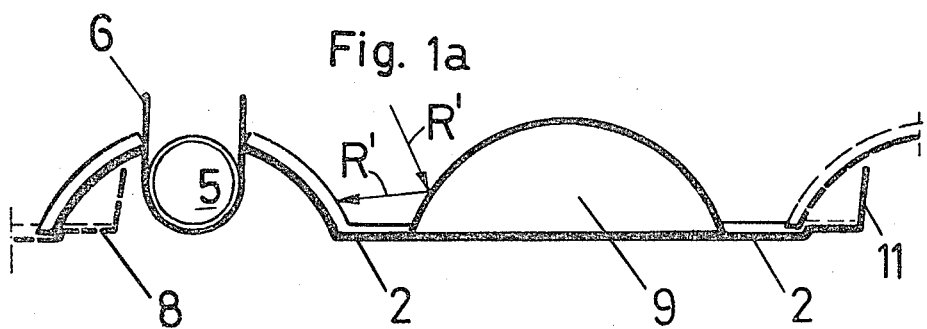

In raised portion 4 is inserted tube 5 retained by clip spring 6 secured to the panel. Transparent cap 7 encloses from above the elevated portion and overlies at one end the following cap (not shown). The next tile 8 is shown in broken line. At 9, there is shown a pyramidal protuberance while at 10 are shown air conduits interconnecting 4 and 9.

Figure 2:
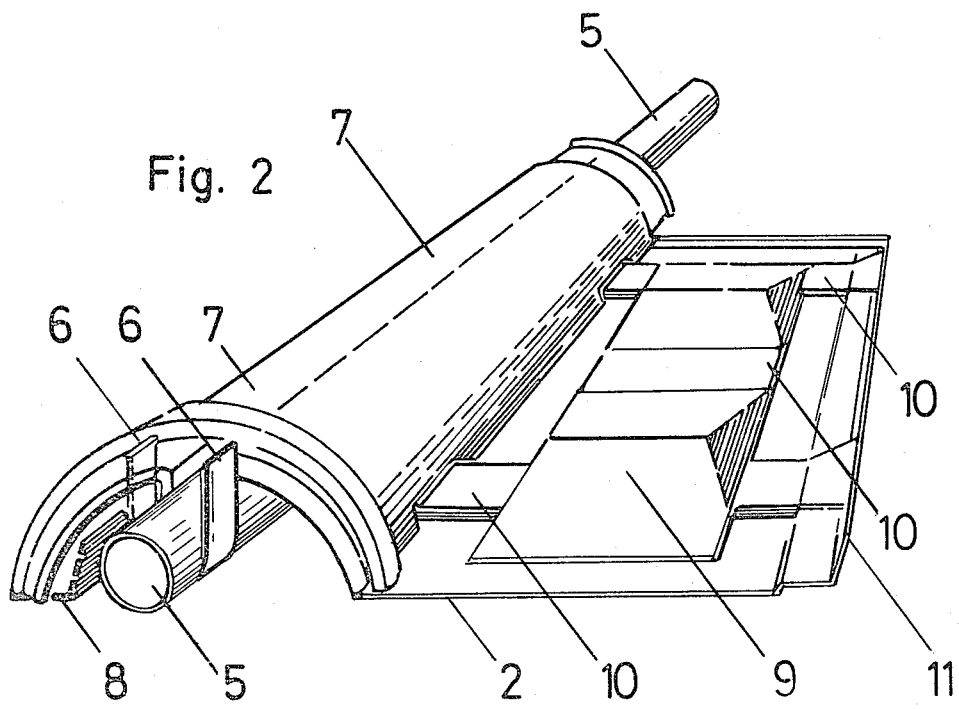

FIG. 2 shows a slightly modified panel in perspective. The numbering of the same parts is identical to that of the preceding figure. There is shown at 11 the lateral edge overlain in its turn by the next tile (not shown).

FIG. 3 shows another embodiment of the invention, without throat 3 and without tube 5 but with raised portion 4 and transparent cap 7. The protuberances 9 are preferably of pyramidal form, or in the form of spherical caps (FIG. 3a) or are partially truncated conical (FIG. 3b). The hot air below protuberances 9 is carried by conduits 10 to raised heat-collecting portion 4 and thence to an air-liquid heat pump (not shown).

The portion of the panel referred to as a tile is comparable to a conventional ceramic tile while having protuberances 9 which project upwardly, of various forms but preferably pyramidal, truncated conical or cupola-shaped, serving to collect solar energy while always presenting at least one of their faces oriented in the optimum position relative to the sunrays and serving as a support for personnel who must walk on the roof, as well as to retain snow.

The recesses below the protuberances are closed at their bottom and are connected with each other and with the recess beneath the raised portion by means of conduits 10 in which air circulates, thus transporting the heat absorbed in the region of the protuberances toward the raised portion 4 and the tube 5.

The conduits create on their upper surfaces reliefs which serve to prevent the longitudinal displacement of the transparent cap.

The tile is disposed on a thermally-insulating panel which is secured to a flat surface resting on the structure carrying the roof. The tile is nailed to this surface through eyelet holes which permit expansion and contraction and removal of the tile. It is possible in this way to cover a sloping roof with an aesthetic effect comparable to that of an ordinary roof covered with traditional tiles. In the raised portion, which because of the superposition of the edges of the tile is continuous from the summit to the base of the incline of the roof, is secured the tube which is covered by the transparent cap.

The tube 5 is retained inposition by an annular clip 6 comprising a spring which permits the emplacement or removal of the tube 5 by simple manual pressure or traction.

At the upper and lower ends of the incline of the roof, the tubes 5 are connected to a collector tube (not shown) which thus integrates all the roof covering in the usual heating equipment for solar energy.

To improve heat absorption and to reduce production costs, it is preferred that the tile according to the present invention be made of glass, ceramic, asbestos-cement agglomerate, or synthetic resin.

Also, the number of throats can be increased, especially in the case of a panel with a large surface.

To avoid reflections, the external surface of the transparent cap, which can be of a synthetic resin, is roughened and/or irregular while the outer surfaces of the protuberances may be so configured as to reflect the sunrays toward the tube as shown by the arrows R, R' in FIGS. 1, 1a, 3 and 3a.

Modifications are possible as follows:

(a) Protuberances 9 may be formed truncated conically or as spherical caps or in such a way as to present portions of their external surface perpendicular to the sunrays and to serve as supports for maintenance or in such a manner as to reflect sunrays toward tube 5.

(b) The tile may have two or more tubes for fluid to be heated, with corresponding transparent caps 7.

(c) Along its edges the tile may have channels and flanges 8, 11 which permit removing it by displacing it lengthwise of the plane of the slope without having to move the adjacent tiles.

(d) The tile can be applied to a panel of insulating material and nailed on the surface of the roof lining by means of nails which pass through suitable eyeholes in the tile and the insulating panel.

(e) Raised portion 4 can be upwardly open so that the tube 5 is seated and retained in the panel while being visible from above, said tube being blackened, and fins or protuberances of the panel serving to retain the tube 5.

(f) Raised portion 4 can be downwardly open such that the tile is applied onto the tube 5 and the latter is invisible from above.

(g) The tile can have cavities disposed in its surface turned toward the sun and can have a concave, spherically capped, pyramidal or truncated conical shape.

(h) Each tube 5 can be fixed in the tile by a cement or substance having good thermal conductivity.

(i) The panel can be partially or completely composed of several materials disposed in layers, the external layer being transparent.

(j) Elemental panels can be interconnected and disposed as conventional tiles with the same aesthetic effect so that the raised portions for the tubes will be continuous from the bottom to the summit of the incline of the roof, thereby to permit insertion of tubes interconnected endwise in conventional collector tubes and to integrate all the surface of the roof into the solar energy collecting equipment.

(k) Panels which are associated and form the covering can be slightly elevated above the support surface, each elemental panel having, toward its base, projecting portions which serve to space the panels from the support and which serve to facilitate heat exchange between the tile and the fluid circulating beneath it.

(l) In the space between the assembly of panels and the support surface can circulate air whose heat is recuperated as by an ordinary air-liquid heat pump.

(m) Several panels can be interconnected in such a way as to form a unit facilitating emplacement of the assembly.

(n) The transverse section of the tube 5, instead of being circular, can be polygonal, square, rectangular, trapezoidal, semi-circular or triangular, each tube having a blackened base disposed upwardly so as to receive solar radiation on a large surface. The cross section of the tube 5 can in fact be anything desired, even having the cross section of a mushroom with a large head exposed to solar radiation.

(o) The pyramidal, truncated conical, spherical cap-shaped or other Without departing from the scope of the appended claims as those skilled in this art will readily understand.

What is claimed is:

1. Solar energy absorptive panel for covering roofs, comprising a tile (2) having at least one downwardly opening raised portion (4) which collects heat, a transparent cap (7) that covers, insulates and protects the raised portion, the tile having at least one protuberance (9) defining a downwardly-opening cavity, said protuberances and raised portion being interconnected by at least one conduit (10) permitting circulation of the air contained in said protuberance so as to transport heat toward said raised collector portion (4), said protuberance (9) being so shaped as to reflect the sunrays toward the raised collector portion.

2. Panel according to claim 1, and at least one upwardly opening spring clip (6) in said raised portion (4), and a metallic tube (5) seated in said spring clip and through which flows the fluid to be heated.

3. Panel according to claim 1, in which the protuberances (9) have the form of pyramids, truncated cones, or spherical caps so as to present portions of their external surface perpendicular to the sunrays and to serve as support for the feet of workers during maintenance.

4. Panel according to claim 1, in which the external surface of the transparent cap is roughened and/or irregular so as to prevent reflection.

* * * * *